United States Patent
Hwang et al.

(10) Patent No.: US 8,766,943 B2
(45) Date of Patent: Jul. 1, 2014

(54) DISPLAY HAVING TOUCH SENSOR AND METHOD FOR IMPROVING TOUCH PERFORMANCE THEREOF

(75) Inventors: Jonghee Hwang, Goyang-si (KR); Suwon Lee, Ansan-si (KR)

(73) Assignee: LG Display Co., Ltd., Seoul (KR)

( * ) Notice: Subject to any disclaimer, the term of this patent is extended or adjusted under 35 U.S.C. 154(b) by 150 days.

(21) Appl. No.: 13/598,243

(22) Filed: Aug. 29, 2012

(65) Prior Publication Data

US 2013/0057493 A1 Mar. 7, 2013

(30) Foreign Application Priority Data

Sep. 1, 2011 (KR) .......................... 10-2011-0088681

(51) Int. Cl.
 *G06F 3/041* (2006.01)
 *G06F 3/044* (2006.01)
(52) U.S. Cl.
 CPC .............. *G06F 3/0418* (2013.01); *G06F 3/044* (2013.01)
 USPC .......................................................... 345/173
(58) Field of Classification Search
 CPC ...................................................... G06F 3/0148
 USPC .......................................................... 345/173
 See application file for complete search history.

(56) References Cited

U.S. PATENT DOCUMENTS

2012/0194452 A1 * 8/2012 Cho et al. ...................... 345/173

* cited by examiner

*Primary Examiner* — Amare Mengistu
*Assistant Examiner* — Shawna Stepp Jones
(74) *Attorney, Agent, or Firm* — Birch, Stewart, Kolasch & Birch, LLP

(57) ABSTRACT

Provided are a display having a touch sensor and a method for improving the touch performance thereof, which can minimize the distortion of an execution result induced by the process of converting the resolution of touch coordinates, by compensating the coordinate values of a touch position by applying different offset values for upper, lower, left, and right sides in accordance with the sensor data values of surrounding sensor nodes adjacent to a center node having peak data.

6 Claims, 12 Drawing Sheets

DISPLAY HAVING TOUCH SENSOR AND METHOD FOR IMPROVING TOUCH PERFORMANCE THEREOF

This application claims the benefit of Korean Patent Application No. 10-2011-0088681 filed on Sep. 1, 2011 in Republic of Korea, which is incorporated herein by reference for all purposes as if fully set forth herein.

BACKGROUND

1. Field of the Invention

The present invention relates to a display having a touch sensor and a method for improving the touch performance thereof.

2. Discussion of the Related Art

Along with the trend of light weight and slim size of home electronic appliances and portable information devices, user input means is switching from a button switch to a touch screen. The touch screen refers to a screen through which a user can enter data by directly touching the screen. Starting with use in the mobile phone market, the use of touch screens is expanding across comprehensive ranges of IT products.

A touch screen applied to a display comprises a plurality of touch sensors. The touch sensors may be incorporated as in-cell type in a display panel, or coupled, as on-cell type or add-on cell type, to the display panel. Touch types are classified into a resistive type, a capacitive type, an electro-magnetic type, etc. Among them, the capacitive type for detecting a touched portion by detecting a position where a capacitance change has occurred is widely used.

Capacitive type touch sensors comprise sensor nodes, respectively, which are formed at intersections of a plurality of Tx lines and a plurality of Rx lines to constitute a mutual capacitor. The capacitive type touch sensors recognize a touch position by calculating a change in the capacitance of the mutual capacitor between before and after a touch.

Since a capacitive type touch screen comprises a few touch sensors for each pixel of the display panel, its physical resolution is lower than the physical resolution of the display panel. Therefore, an operation of correcting a difference in physical resolution between the touch screen and the display panel is performed in a display having a touch sensor, before executing an application program associated with coordinate values of a touch position. By a resolution correction operation, touch coordinates detected with a resolution level of the touch screen are converted into those with a resolution level of the display panel, as shown in FIG. 1.

A known resolution correction technique includes a method of multiplying a resolution increase ratio by touch coordinates detected with a resolution level of a touch screen. For example, if the resolution of the display panel is A*B and the touch coordinates detected with the resolution level of the touch screen (C*D)(C<A,D<B) are X,Y, and the existing resolution correction technique is used, X is converted into a coordinate value incremented by A/C, and Y is converted into a coordinate value incremented by B/D.

In such a conventional resolution correction technique, calculation is performed only on the coordinates of a touch sensor with the largest change in capacitance, without considering surrounding touch sensors. This makes accurate coordinate matching difficult at the time of resolution conversion, thus making it difficult for a user t display a desired execution result on the display panel. In an example, even if the user draws a straight or curve on the touch screen, it will be distorted, as is the aliasing phenomenon shown in FIG. 2, when actually displayed on the display panel. The conventional resolution correction technique alone will not suffice to improve touch performance.

SUMMARY

An aspect of this document is to provide a display having a touch sensor, which improves touch performance by minimizing the distortion of an execution result, which is induced by the process of correcting the resolution of touch coordinates.

A method for improving the touch performance of a display having a touch sensor according to one exemplary embodiment of the present invention comprises: converting the voltage of sensor nodes input from a touch screen integrated with a display panel into sensor data; detecting peak data from among the sensor data; calculating a first offset value for the X-axis based on sensor data of a left sensor node and a right sensor node and the peak data, the left sensor node and the right sensor node being disposed at both sides in the X-axis direction, with a center node being interposed therebetween, the center node being closest to a touch position and having the peak data; compensating the X coordinate of the touch position by adding the first offset value to the X coordinate of the center node to generate a first resulting value and multiplying the first resulting value by a first resolution ratio, obtained by dividing the horizontal resolution of the display panel by the horizontal resolution of the touch screen; calculating a second offset value for the Y-axis based on sensor data of an upper sensor node and a lower sensor node and the peak data, the upper sensor node and the lower sensor node being disposed at both sides in the Y-axis direction, with the center node being interposed therebetween; and compensating the Y coordinate of the touch position by adding the second offset value to the Y coordinate of the center node to generate a second resulting value and multiplying the second resulting value by a second resolution ratio, obtained by dividing the longitudinal resolution of the display panel by the longitudinal resolution of the touch screen.

The method for improving touch performance comprises: generating a first correction function for correcting the nonlinearity of a change in sensor data by position between the center node and the left sensor node or right sensor node by using the sensor data of either the left sensor node or the right sensor node and the peak data; and firstly correcting the sensor data of the left sensor node, the sensor data of the right sensor node, and the peak data, which are used to calculate the first offset value, by using the first correction function.

The method for improving touch performance comprises: generating a second correction function for correcting the nonlinearity of a change in sensor data by position between the center node and the upper sensor node or lower sensor node by using the sensor data of either the upper sensor node or the right sensor node and the peak data; and secondly correcting the sensor data of the upper sensor node, the sensor data of the lower sensor node, and the peak data, which are used to calculate the second offset value, by using the second correction function.

A display having a touch sensor according to an exemplary embodiment of the present invention comprises: an analog-to-digital converter that converts the voltage of sensor nodes input from a touch screen integrated with a display panel into sensor data; a peak data detector that detects peak data from among the sensor data; an offset value calculator that calculates a first offset value for the X-axis based on sensor data of a left sensor node and a right sensor node and the peak data, the left sensor node and the right sensor node being disposed at both sides in the X-axis direction, with a center node being interposed therebetween, the center node being closest to a touch position and having the peak data, and calculates a second offset value for the Y-axis based on sensor data of an upper sensor node and a lower sensor node and the peak data, the upper sensor node and the lower sensor node being disposed at both sides in the Y-axis direction with the center node being interposed therebetween; a resolution converter that compensates the X coordinate of the touch position by adding the first offset value to the X coordinate of the center node to generate a first resulting value and multiplying the first resulting value by a first resolution ratio, obtained by dividing the horizontal resolution of the display panel by the horizontal resolution of the touch screen and compensates the Y coordinate of the touch position by adding the second offset value to the Y coordinate of the center node to generate a second resulting value and multiplying the second resulting value by a second resolution ratio, obtained by dividing the longitudinal resolution of the display panel by the longitudinal resolution of the touch screen.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Hereinafter, an exemplary embodiment of the present invention will be described in detail with reference to FIGS. 3 to 19.

Figure 1:
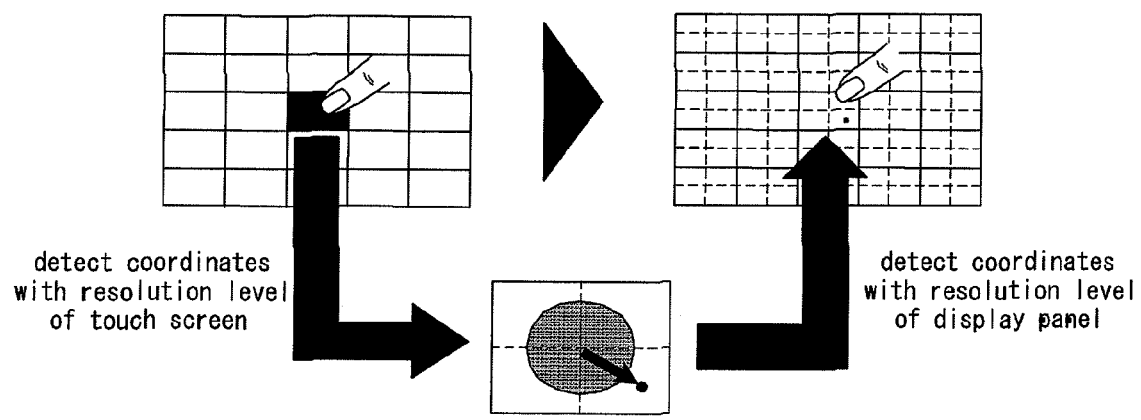
FIG. 1 is a view for explaining the technique of correcting the resolution of X and Y coordinates.
Figure 2:
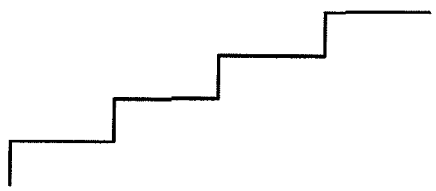
FIG. 2 is a view showing the distortion of an execution result (straight line or curve) induced by the conventional resolution correction technique.
Figure 3:
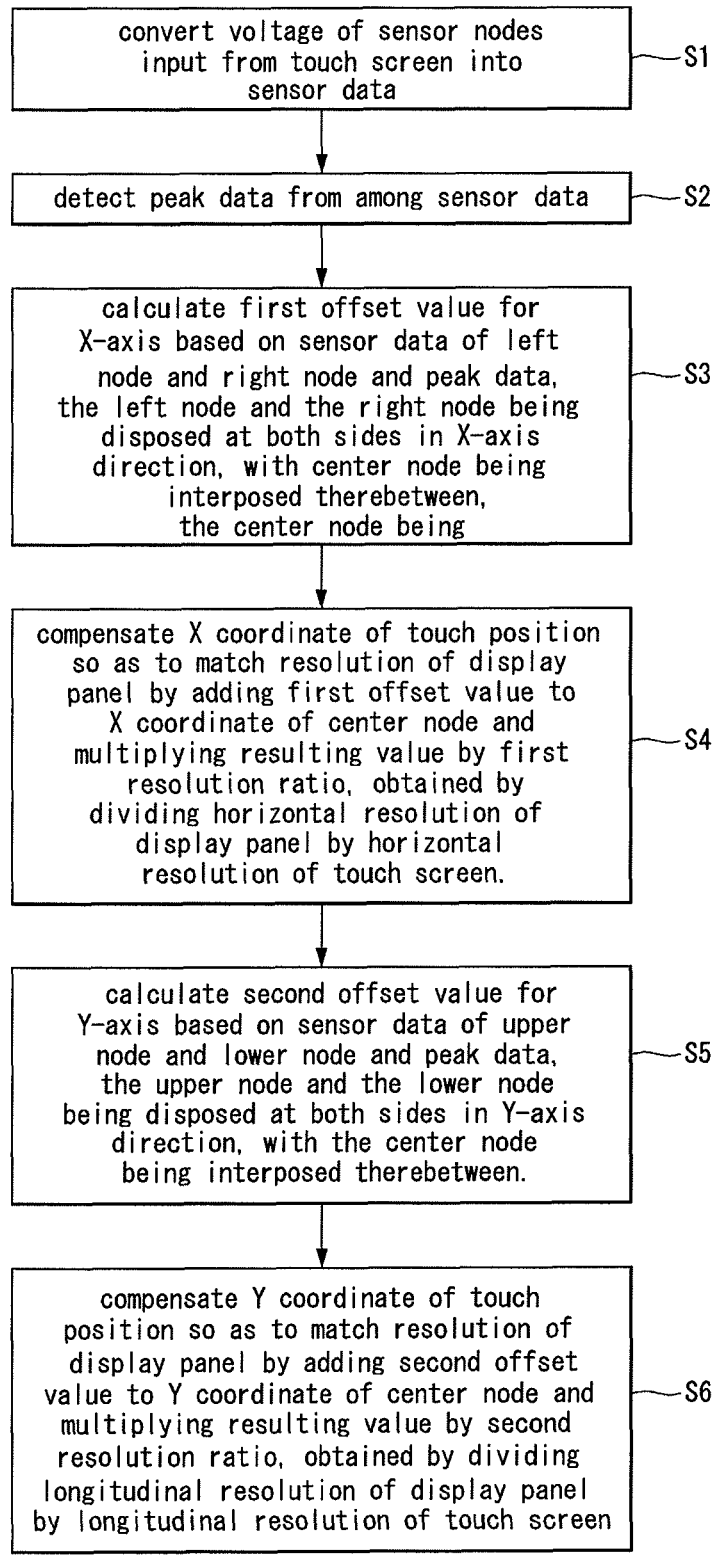
FIG. 3 is a flowchart showing a method for improving the touch performance of a display having a touch sensor according to an exemplary embodiment of the present invention.

FIG. 3 is a flowchart showing a method for improving the touch performance of a display having a touch sensor according to an exemplary embodiment of the present invention. FIGS. 4 to 8 are views for explaining in detail the method for improving the touch performance of a display having a touch sensor according to an exemplary embodiment of the present invention.

Referring to FIG. 3, in the method for improving touch performance according to an exemplary embodiment of the present invention, the voltage of sensor nodes input from a touch screen is converted into sensor data (S1).

Figure 4:
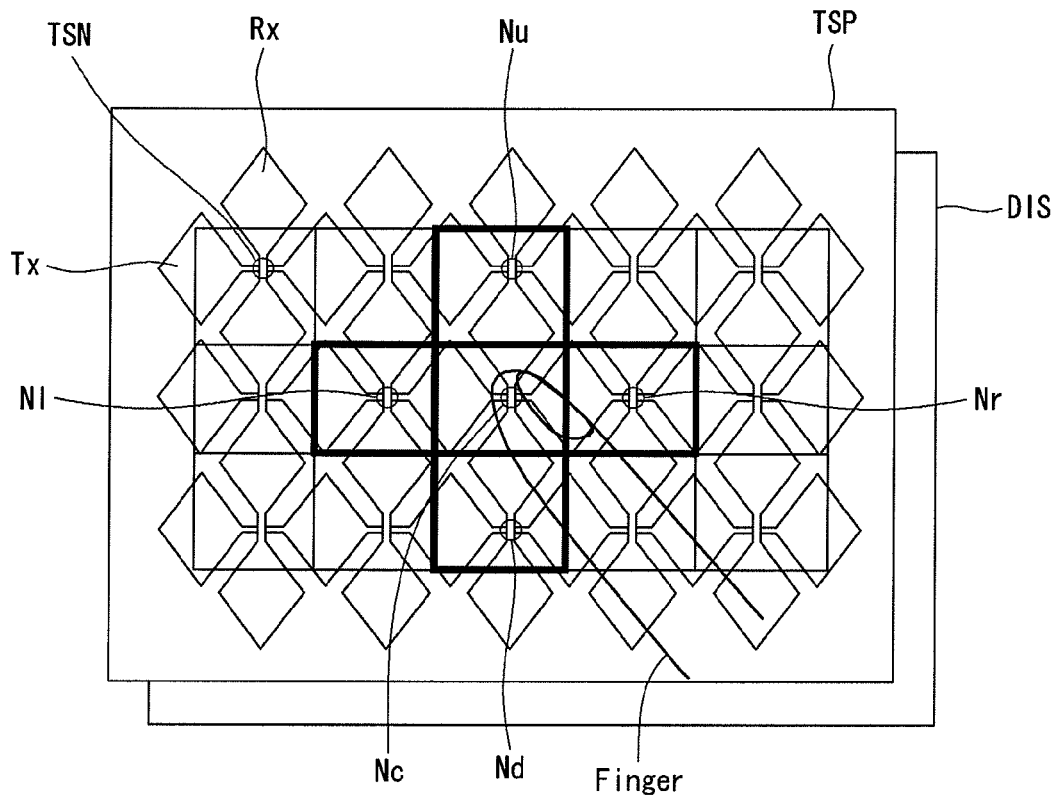
FIG. 4 is a view showing a touch screen coupled to or incorporated in a display panel.

As shown in FIG. 4, the touch screen TSP may be coupled, as an on-cell type or add-on cell type, to a display panel DIS. Otherwise, the touch screen TSP may be incorporated as an in-cell type in the display panel DIS. As shown in FIG. 4, the touch screen TSP comprises Tx electrodes, Rx electrodes intersecting the Tx electrodes, and a plurality of sensor nodes TSNs formed at the intersections of the Tx electrodes and the Rx electrodes to constitute a mutual capacitor.

In the method for improving touch performance, peak data, which has the largest change between before and after a touch, is detected from among the sensor data (S2). The peak data corresponds to the voltage of the sensor node closest to a touch position which someone's finger (or conductive material) touches on the touch screen TSP.

Figure 5:
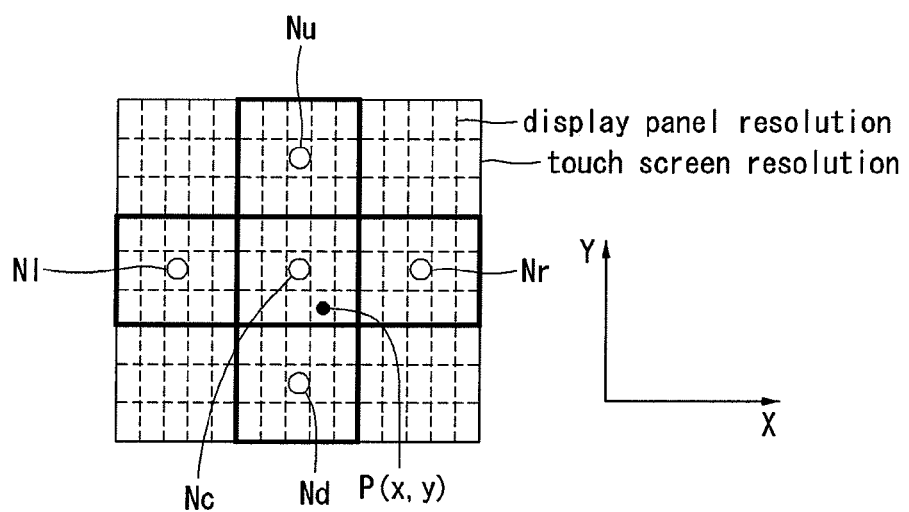
FIG. 5 is a view showing the difference in physical resolution between a touch screen and a display panel.

As shown in FIG. 5, the physical resolution of the touch screen TSP is much lower than the physical resolution of the display panel DIS. In FIG. 5, a solid line indicates the physical resolution of the touch screen TSP for defining a touch cell, and a dotted line indicates the physical resolution of the display panel DIS for defining a pixel. To correct a difference in physical resolution between the touch screen TSP and the display panel DIS, this method for improving touch performance is carried out by taking into consideration not only conventional peak data, but also sensor data of surrounding sensor nodes Nr, Nl, Nu, and Nd adjacent to the center node Nc closest to a touch position P (x,y).

Figure 6:
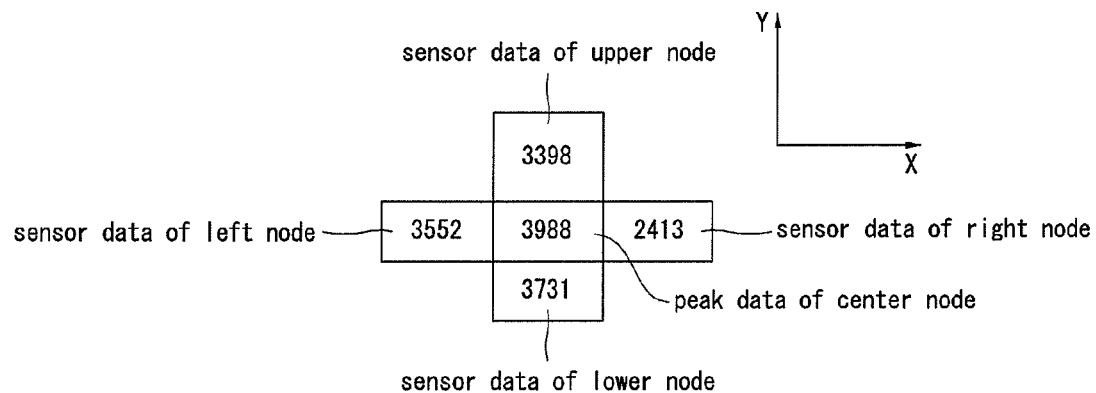
FIG. 6 is a view showing an example of sensor data of a center node and surrounding sensor nodes.

The surrounding sensor nodes comprise a left sensor node Nl and a right sensor node Nr which are disposed at both sides in an X-axis direction, with the center node Nc interposed therebetween, and an upper sensor node Nu and a lower sensor node Nd which are disposed at both sides in a Y-direction, with the center node Nc interposed therebetween. FIG. 6 illustrates an example of the peak data of the center node Nc and the sensor data of the surrounding sensor nodes Nr, Nl, Nu, and Nd when the touch position P(x,y) on the touch cell comprising the center node Nc is located, tilting toward the right sensor node Nr and the lower sensor node Nd, as shown in FIG. 5. A sensor node closer to the touch position P(x,y) has a larger data size. In FIG. 6, the peak data value of the center node Nc is '3998', the sensor data value of the right sensor node Nr is '3553', the sensor data value of the lower sensor node Nd is '3731', and the sensor data value of the left sensor node Nl is '2413'.

In the method for improving touch performance, the coordinates of the touch position P(x,y) are corrected so as to match the resolution of the display panel DIS by using the technique of adding different weighted values for upper, lower, left, and right sides in accordance with the sensor data values of the surrounding sensor nodes Nr, Nl, Nu, and Nd.

Figure 7:
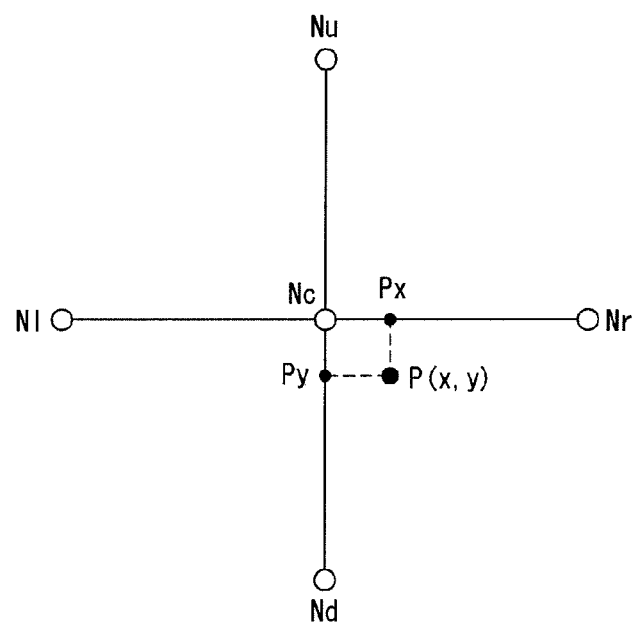
FIG. 7 is a view showing an example of a touch position located on a touch screen.

First, in the method for improving touch performance, a first offset value Δx for the X-axis is calculated by applying the sensor data value of the left sensor node Nl, the sensor data value of the right sensor node Nr, and the peak data value of the center node Nc to the following Equation 1, in order to convert the X coordinate Px of the touch position P(x,y) shown in FIG. 7 into a corrected X coordinate matching the resolution of the display panel DIS (S3).

$$\Delta x = \frac{right - left}{2 \times (center - left)} \quad \text{[Equation 1]}$$

where 'center' denotes the peak data value of the center node Nc, 'left' denotes the sensor data value of the left sensor node Nl, and 'right' denotes the sensor data value of the right sensor node Nr.

If the X coordinate Px of the touch position P(x,y) is located, tilting toward the left sensor node Nl, and therefore the sensor data value (left) of the left sensor node Nl is greater than the sensor data value (right) of the right sensor node Nr, the following Equation 1 can be applied to the calculation of the first offset value Δx.

$$\Delta x = \frac{left - right}{2 \times (center - right)} \quad \text{[Equation 2]}$$

In the method for improving touch performance, as shown in the following Equation 3, the X coordinate Px of the touch position P(x,y) is converted into a corrected X coordinate Px' matching the resolution of the display panel DIS by adding the first offset value Δx to the X coordinate x(Nc) of the center node Nc, and then multiplying the resulting value by a first resolution ratio Nx, obtained by dividing the horizontal resolution (resolution for the X-axis) of the display panel DIS by the horizontal resolution of the touch screen TSP (S4).

$$Px' = (x(Nc) + \Delta x) \times Nx \quad \text{[Equation 3]}$$

Next, in the method for improving touch performance, a second offset value Δy for the Y-axis is calculated by applying the sensor data value of the upper sensor node Nu, the sensor data value of the lower sensor node Nd, and the peak data value of the center node Nc to the following Equation 4, in order to convert the Y coordinate Py of the touch position P(x,y) shown in FIG. 7 into a corrected Y coordinate matching the resolution of the display panel DIS (S5).

$$\Delta y = \frac{down - up}{2 \times (center - up)} \quad \text{[Equation 4]}$$

where 'center' denotes the peak data value of the center node Nc, 'up' denotes the sensor data value of the upper sensor node Nu, and 'down' denotes the sensor data value of the lower sensor node Nd.

If the Y coordinate Py of the touch position P(x,y) is located, tilting toward the upper sensor node Nu, and therefore the sensor data value (up) of the upper sensor node Nu is greater than the sensor data value (down) of the lower sensor node Nd, the following Equation 5 can be applied to the calculation of the second offset value Δy.

$$\Delta y = \frac{up - down}{2 \times (center - down)} \quad \text{[Equation 5]}$$

In the method for improving touch performance, as shown in the following Equation 6, the Y coordinate Py of the touch position P(x,y) is converted into a corrected Y coordinate Py' matching the resolution of the display panel DIS by adding the second offset value Δx to the Y coordinate y(Nc) of the center node Nc, and then multiplying the resulting value by a second resolution ratio Ny, obtained by dividing the longitudinal resolution (resolution for the Y-axis) of the display panel DIS by the longitudinal resolution of the touch screen TSP.

$$Py = (y(Nc) + \Delta y) \times Ny \quad \text{[Equation 6]}$$

Figure 8:
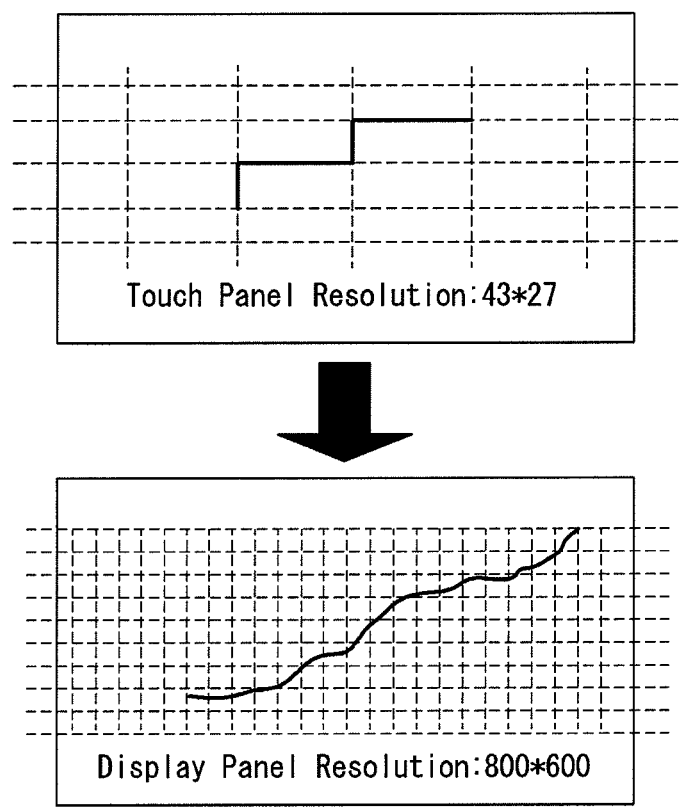
FIG. 8 is a view showing a result of execution of a method for improving touch performance according to an exemplary embodiment of the present invention.

In this way, the method for improving touch performance according to an exemplary embodiment of the present invention uses the technique of adding different offset values for upper, lower, left, and right sides in accordance with the sensor data values of the surrounding sensor nodes Nr, Nl, Nu, and Nd, whereby touch performance is improved, as shown in FIG. 8, by minimizing the distortion of an execution result, which is induced by the process of correcting the resolution of touch coordinates.

Figure 9A:
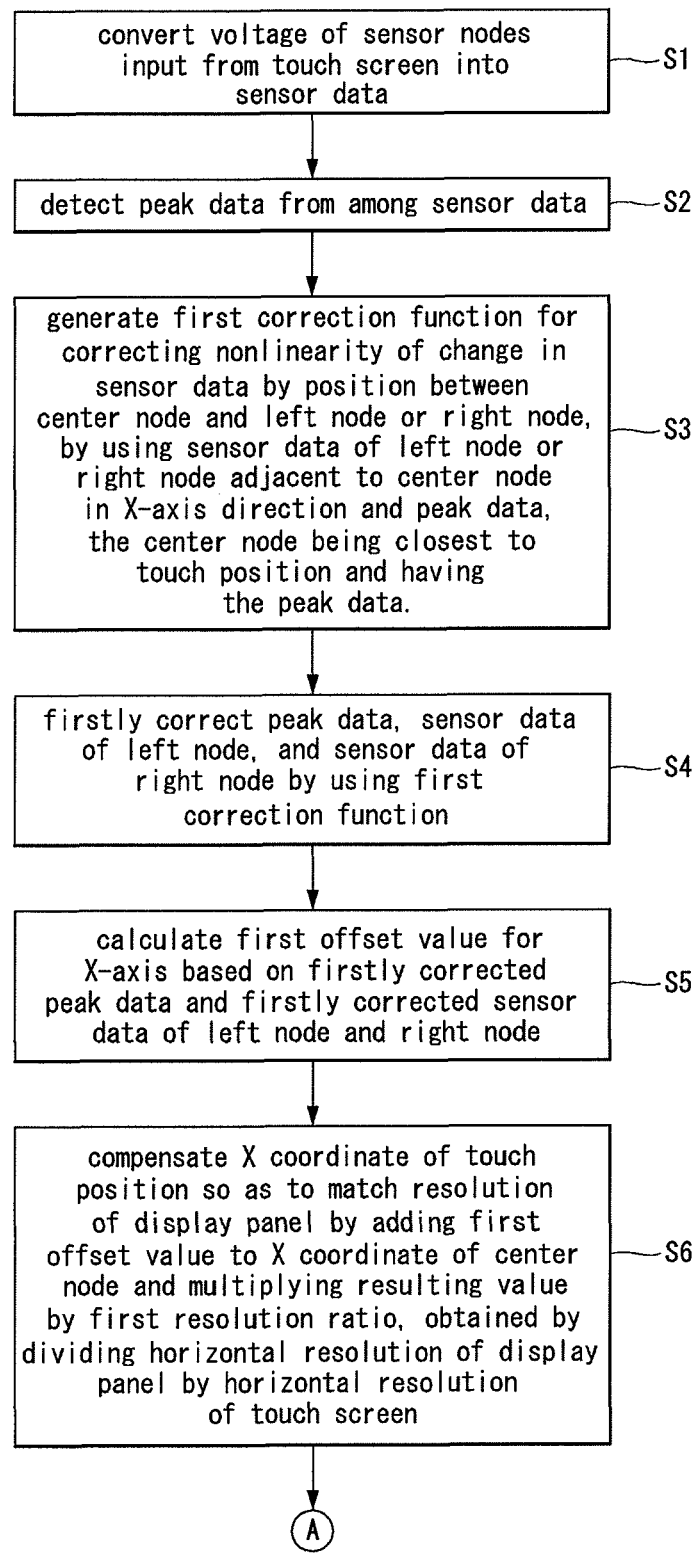
FIGS. 9A and 9B are flowcharts showing a method for improving the touch performance of a display having a touch sensor according to another exemplary embodiment of the present invention.
Figure 9B:
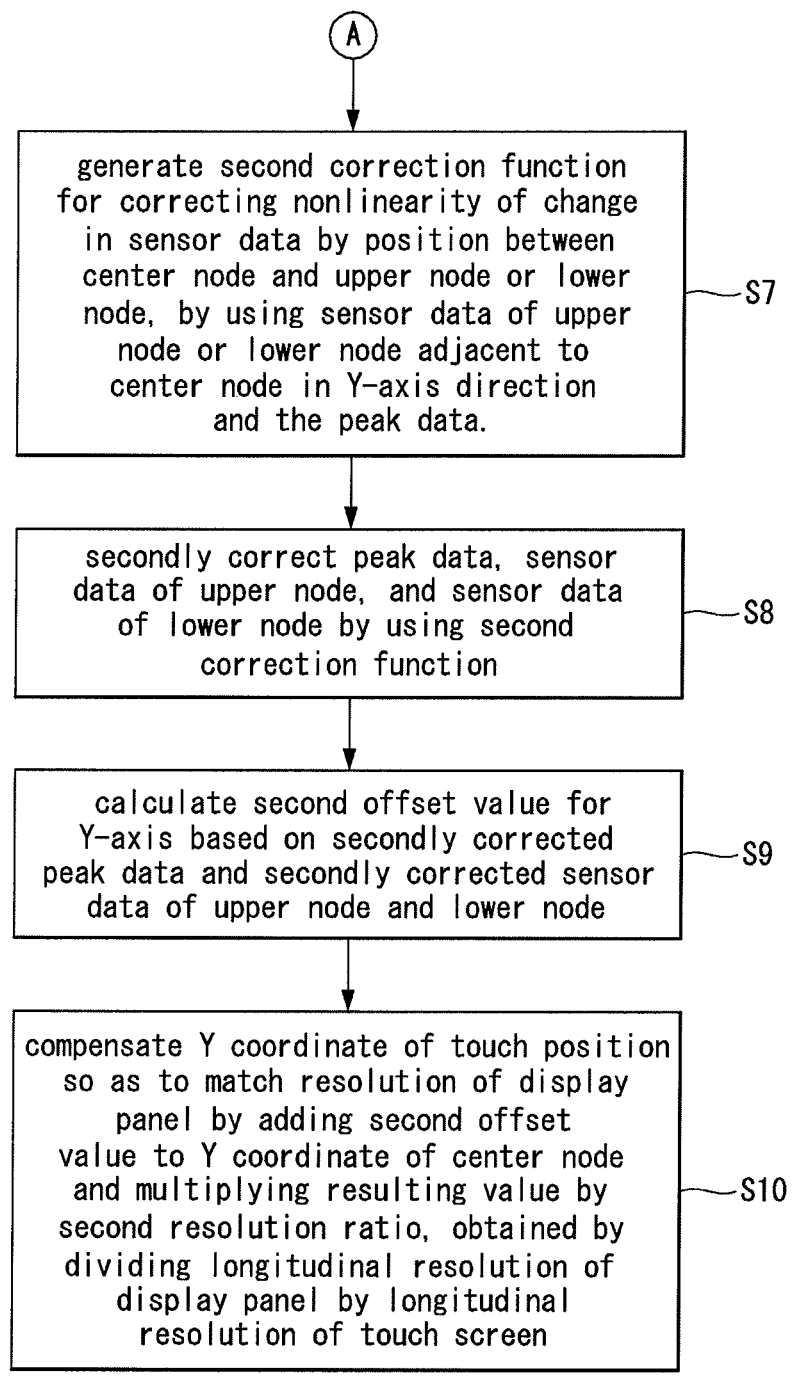

FIGS. 9A and 9B are flowcharts showing a method for improving the touch performance of a display having a touch sensor according to an exemplary embodiment of the present invention. FIGS. 10 to 13 are views for explaining in detail a method for improving the touch performance of a display having a touch sensor according to an exemplary embodiment of the present invention.

A method for improving touch performance according to another exemplary embodiment of the present invention further comprises the preprocessing steps (S3 and S4 of FIG. 9A and S7 and S8 of FIG. 9B) of correcting the nonlinearity of a change in capacitance (i.e., change in sensor data) depending on a touch position between sensor nodes of a touch screen TSP, prior to the steps (S5 and S6 of FIG. 9A and S9 and S10 of FIG. 9B) of converting the resolution of the touch screen TSP into the resolution of a display panel DIS.

Referring to FIGS. 9A and 9B, in the method for improving touch performance according to another exemplary embodiment of the present invention, the voltage of sensor nodes input from a touch screen is converted into sensor data (S1).

In the method for improving touch performance, peak data, which has the largest change between before and after a touch, is detected from among the sensor data (S2). The peak data corresponds to the voltage of the sensor node closest to a touch position which someone's finger (or conductive material) touches on the touch screen TSP.

Figure 10:
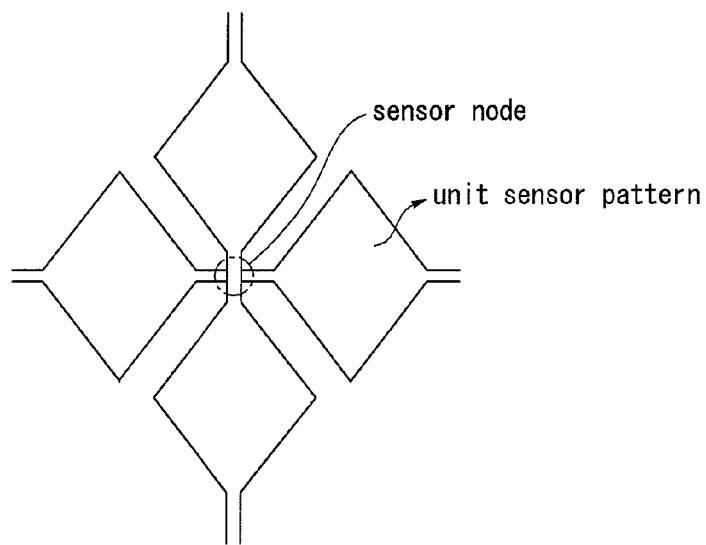
FIG. 10 is an enlarged view of a touch sensor pattern.
Figure 11:
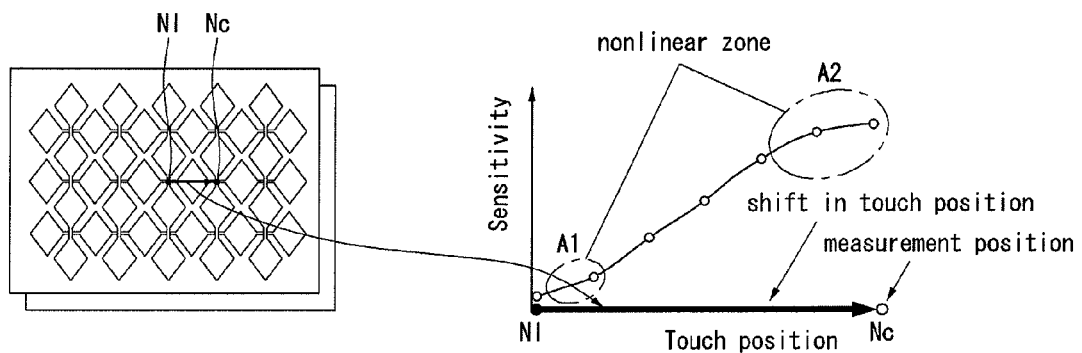
FIG. 11 is a view showing a change in capacitance depending on a touch position in a unit sensor pattern formed between sensor nodes of a touch screen.

In the method for improving touch performance, even a change in capacitance depending on a touch position in a unit sensor pattern formed between the sensor nodes of the touch screen TSP is further taken into account, as shown in FIG. 10. For example, assuming that the size of the sensor pattern is 5.1 mm×5.1 mm, and the pixel size of the display panel DIS is 300 μm×300 μm, 17 pixels are located in X- and Y-axis directions in the unit sensor pattern of the touch screen TSP. As shown in FIG. 11, when a touch position is moved from a left sensor node Nl to a center node Nc, i.e., a measurement position, on the sensor pattern disposed between the left sensor node Nl and the center node Nc, a change in capacitance shows a nonlinear characteristic in a first area A1 where 1 to 3 pixels are located and in a second area A2 where 14 to 17 pixels are located. Without this nonlinear characteristic being taken into account, it may be difficult to perform accurate coordinate matching in a nonlinear zone at the time of resolution conversion. The method for improving touch performance according to another exemplary embodiment of the present invention comprises the method for improving touch performance according to an exemplary embodiment of the present invention, and is carried out as follows in order to further take the nonlinearity of a change in capacitance into consideration.

In the following description, FIG. 4 to FIG. 7 are used as it is.

First, in the method for performing touch performance, in order to convert the X coordinate Px of a touch position P(x,y) shown in FIG. 7 into a corrected X coordinate matching the resolution of the display panel DIS, the preprocessing steps S3 and S4 are carried out, and based on the result, the resolution conversion steps S5 and S6 explained in an exemplary embodiment are carried out.

In the method for improving touch performance, a first correction function for correcting the nonlinearity of a change in sensor data by position (i.e., a change in capacitance) between the center node Nc and the left sensor node Nl or right sensor node Nr is generated by using sensor data of the left sensor node Nl or right sensor node Nr adjacent to the center node Nc in the X-axis direction and the peak data, the center node Nc being closest to the touch position P(x,y) and having the peak data (S3).

Figure 12:
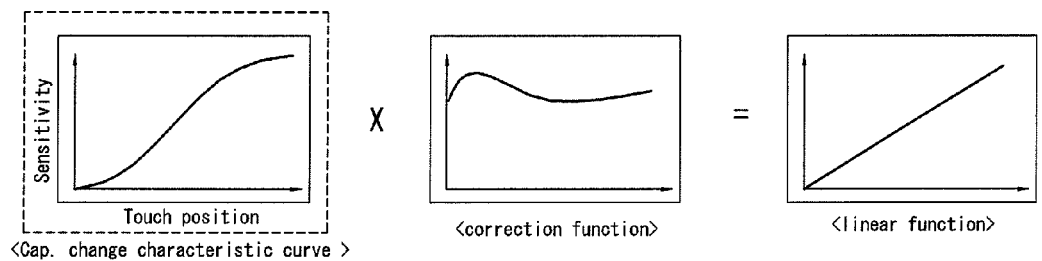
FIG. 12 is a view for explaining the principle of obtaining a correction function.

The first correction function can be obtained by dividing a linear graph of changes in sensor data by position by a nonlinear graph of changes in sensor data by position as shown in FIG. 12. The linear graph of changes in sensor data by position is a value which can be previously detected by the peak data of the center node Nc and the sensor data of the neighboring left sensor node Nl or right sensor node Nr. Also, the nonlinear graph of changes in sensor data by position is a value which is predefined by a test.

In the method for improving touch performance, the peak data of the center node Nc, the sensor data of the left sensor node Nl, and the sensor data of the right sensor node Nr are firstly corrected by using the generated first correction function (S4).

In the method for improving touch performance, a first offset value $\Delta x$ for the X-axis is calculated by applying the firstly corrected peak data of the center node Nc, the firstly corrected sensor data of the left sensor node Nl, and the firstly corrected sensor data of the right sensor node Nr to Equation 1 (or Equation 2 in some cases), similarly to S3 of FIG. 3 (S5).

In the method for improving touch performance, as shown in the following Equation 3 similarly to S4 of FIG. 4, the X coordinate Px of the touch position P(x,y) is converted into a corrected X coordinate Px' matching the resolution of the display panel DIS by adding the first offset value $\Delta x$ to the X coordinate x(Nc) of the center node Nc, and then multiplying the resulting value by a first resolution ratio Nx, obtained by dividing the horizontal resolution (resolution for the X-axis) of the display panel DIS by the horizontal resolution of the touch screen TSP (S6).

Next, in the method for improving touch performance, in order to convert the Y coordinate Py of the touch position P(x,y) shown in FIG. 7 into a corrected Y coordinate matching the resolution of the display panel DIS, the preprocessing steps S7 and S8 are carried out, and based on the result, the resolution conversion steps S9 and S10 explained in an exemplary embodiment are carried out.

In the method for improving touch performance, a second correction function for correcting the nonlinearity of a change in sensor data by position (i.e., a change in capacitance) between the center node Nc and the upper sensor node Nu or lower sensor node Nd is generated by using the sensor data of the upper sensor node Nu or lower sensor node Nd adjacent to the center node Nc in the Y-axis direction and the peak data, the center node Nc being closest to the touch position P(x,y) and the peak data (S7). The second correction function can be obtained in the same manner as the above-explained first correction function.

In the method for improving touch performance, the peak data of the center node Nc, the sensor data of the upper sensor node Nu, and the sensor data of the lower sensor node Nd are secondly corrected by using the generated second correction function (S8).

In the method for improving touch performance, a second offset value $\Delta y$ for the Y-axis is calculated by applying the secondly corrected peak data of the center node Nc, the secondly corrected sensor data of the upper sensor node Nu, and the secondly corrected sensor data of the lower sensor node Nd to Equation 4 (or Equation 5 in some cases), similarly to S5 of FIG. 3 (S9).

In the method for improving touch performance, as shown in the following Equation 6 similarly to S6 of FIG. 3, the Y coordinate Py of the touch position P(x,y) is converted into a corrected Y coordinate Py' matching the resolution of the display panel DIS by adding the second offset value $\Delta y$ to the Y coordinate y(Nc) of the center node Nc, and then multiplying the resulting value by a second resolution ratio Ny, obtained by dividing the longitudinal resolution (resolution for the Y-axis) of the display panel DIS by the longitudinal resolution of the touch screen TSP (S10).

Figure 13:
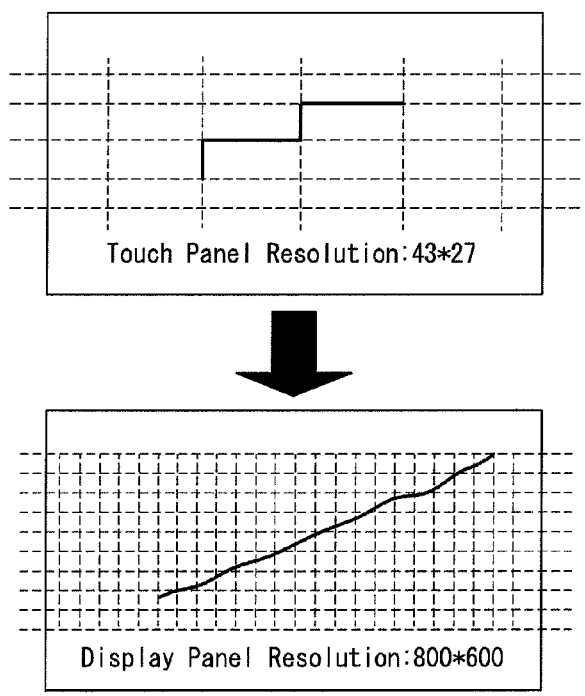
FIG. 13 is a view showing an effect of execution of a method for improving touch performance according to another exemplary embodiment of the present invention.

In this way, the method for improving touch performance according to another exemplary embodiment of the present invention can drastically improve touch performance, as shown in FIG. 13, by minimizing the distortion of an execution result, induced by the process of converting the resolution of touch coordinates, by using the technique of carrying out the preprocessing step of correcting the nonlinearity of a change in sensor data by position (i.e., a change in capacitance) depending on a touch position between the sensor nodes of the touch screen TSP and then adding different offset values for upper, lower, left, and right sides in accordance with the corrected sensor data values of the surrounding sensor nodes Nr, Nl, Nu, and Nd.

Figure 14:
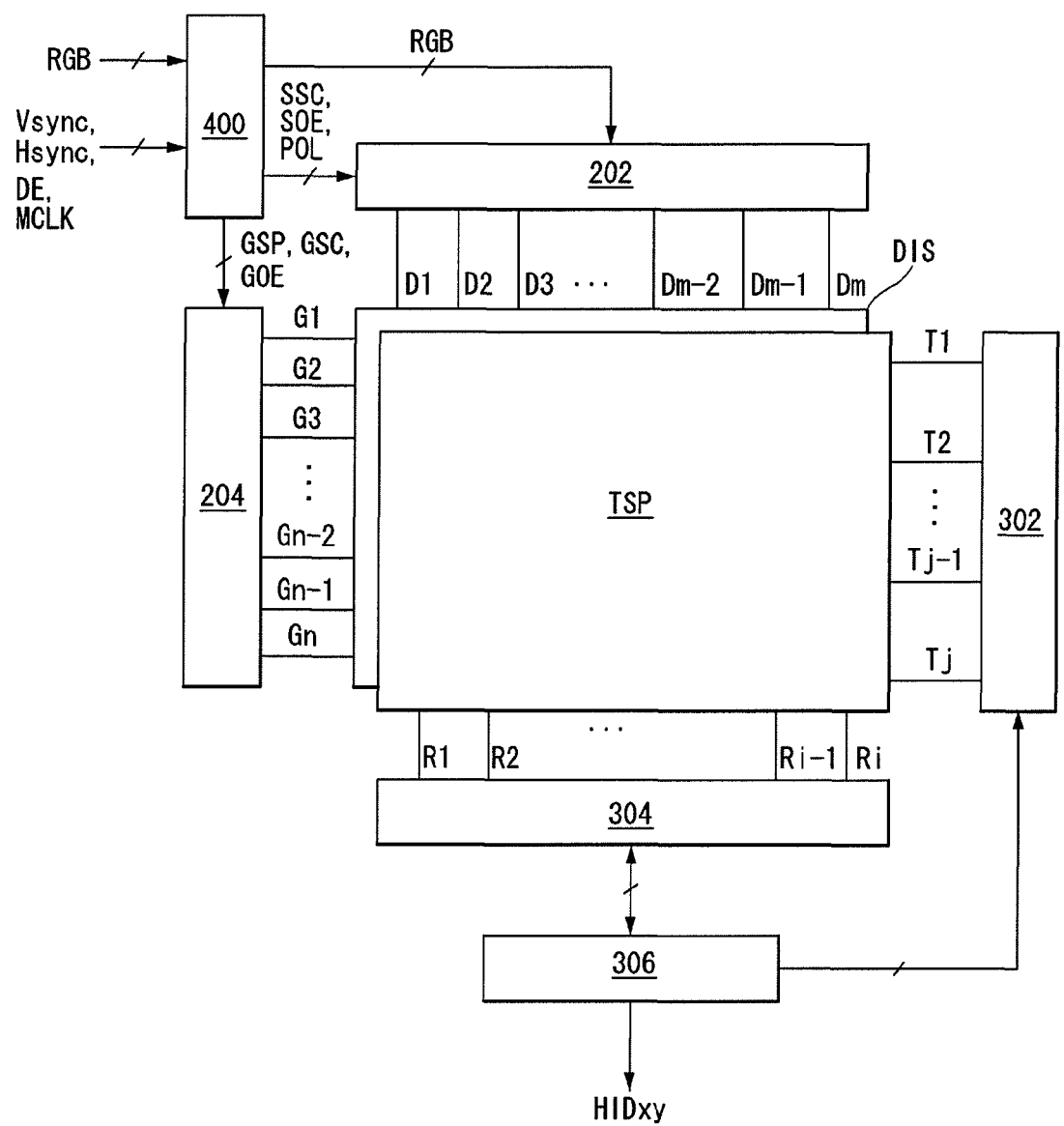
FIG. 14 is a block diagram showing a display according to an exemplary embodiment of the present invention.
Figure 15:
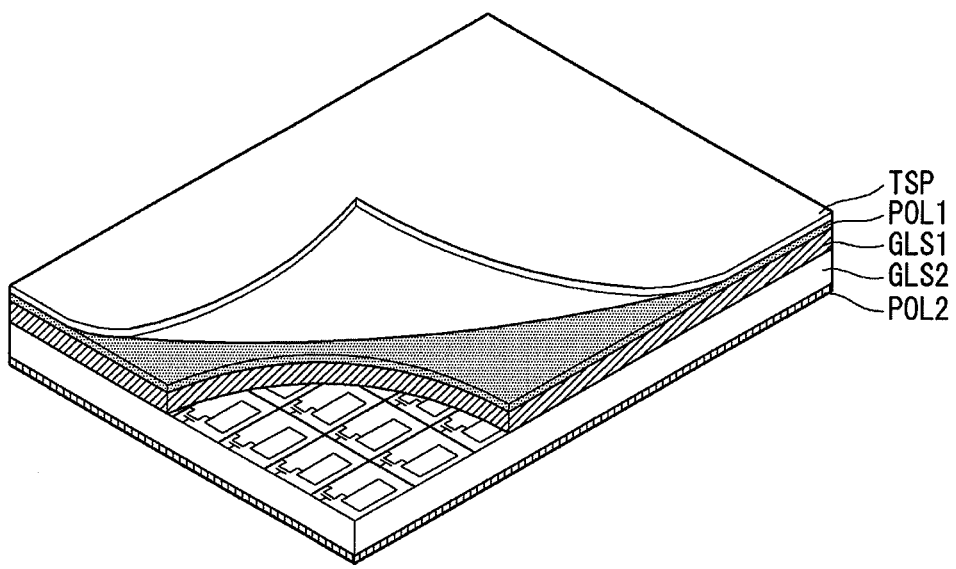
FIGS. 15 to 17 are views showing various embodiments of a touch screen and a display panel.
Figure 16:
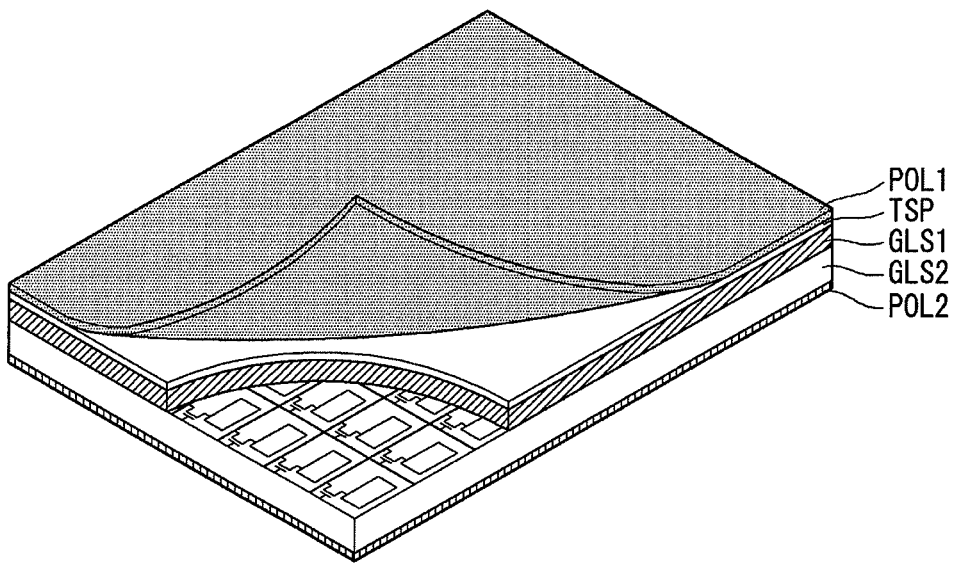
Figure 17:
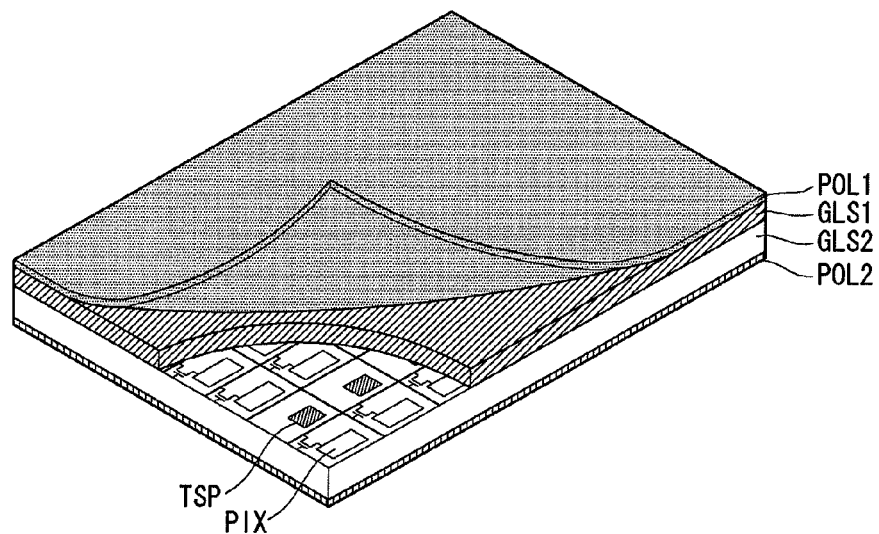

FIG. 14 is a block diagram showing a display having a touch sensor according to an exemplary embodiment of the present invention. FIGS. 15 to 17 are views showing various embodiments of a touch screen and a display panel.

Referring to FIG. 14, the display according to the exemplary embodiment of the present invention comprises a display panel DIS, a display drive circuit 202 and 204, a timing controller 400, a touch screen TSP, a touch screen drive circuit 302 and 304, and a touch controller 306.

The display according to the present invention may be implemented as a flat panel display device such as a liquid crystal display (LCD), a field emission display (FED), a plasma display panel (PDP), an organic light emitting display (OLED), and an electrophoresis display (EPD). Although the exemplary embodiments have described the liquid crystal display as an example of the flat panel display device, it is to be noted that the display of the present invention is not limited to the liquid crystal display.

The display panel DIS has a liquid crystal layer formed between two substrates. The lower substrate of the display panel DIS comprises a plurality of data lines D1 to Dm (m is a natural number), a plurality of gate lines G1 to Gn (n is a natural number) intersecting the data lines D1 to Dm, a plurality of thin film transistors TFTs formed at the intersections of the data lines D1 to Dm and the gate lines G1 to Gn, a plurality of pixel electrodes for charging liquid crystal cells with a data voltage, and a storage capacitor connected to the pixel electrodes and sustaining the voltage of the liquid crystal cells.

Pixels of the display panel DIS are formed in pixel areas defined by the data lines D1 to Dm and the gate lines G1 to Gn, and disposed in a matrix form. Liquid crystal cells of the respective pixels are driven by an electric field applied by a voltage difference between a data voltage applied to the pixel electrodes and a common voltage applied to a common electrode, and adjusts the amount of transmission of incident light. The TFTs are turned on in response to gate pulses from the gate lines G1 to Gn, and supply voltages from the data lines D1 to Dm to the pixel electrodes of the liquid crystal cells.

The upper substrate of the display panel DIS may comprise black matrix, color filters, etc. The lower substrate of the display panel DIS may be implemented in a color filter-on-TFT (COT) structure. In this case, the black matrix and the color filters may be formed on the lower substrate of the display panel DIS.

Polarizers are respectively attached to the upper substrate and the lower substrate. An alignment film is formed to set a pre-tilt angle of liquid crystal at an inner surface contacting the liquid crystal. A column spacer may be formed between the upper and lower substrates of the display panel DIS to sustain a cell gap of liquid crystal cells.

A backlight unit may be disposed on the back surface of the display panel DIS. The backlight unit is implemented as an edge type or direct type backlight unit to irradiate light to the display panel DIS. The display panel DIS may be implemented in any well-known liquid crystal mode, such as a TN (Twisted Nematic) mode, a VA (Vertical Alignment) mode, an IPS (In-Plane Switching) mode, and an FFS (Fringe Field Switching) mode.

The display drive circuit comprises a data drive circuit 202 and a scan drive circuit 204, and writes video data voltages of an input image to the pixels. The data drive circuit 202 converts digital video data RGB input from the timing controller 400 into an analog positive/negative gamma compensation voltage to generate data voltages. The data voltages are supplied to the data lines D1 to Dm. The scan drive circuit 204 sequentially supplies gate pulses (or scan pulses) synchronized with the data voltages to the gate lines G1 to Gn to select pixel lines of the display panel DIS to write the data voltages.

The timing controller 400 receives timing signals, such as a vertical synchronization signal Vsync, a horizontal synchronization signal Hsync, a data enable signal DE, and a main clock MCLK from an external host system. The timing controller 400 generates display timing control signals to control operation timings of the data drive circuit 202 and scan drive circuit 204. The scan timing control signal comprises a gate start pulse GSP, a gate shift clock, a gate output enable signal GOE, etc. The data timing control signal comprises a source sampling clock SSC, a polarity control signal POL, a source output enable signal SOE, etc.

The touch screen TSP may be bonded to the upper polarizer POL1 of the display panel DIS, as shown in FIG. 15, and may be formed between the upper polarizer POL1 and the upper substrate GLS1, as shown in FIG. 16. Moreover, the touch screen TSP may be formed as an in-cell type on the lower substrate, along with the pixel array, in the display panel DIS, as shown in FIG. 17. In FIGS. 15 to 17, "PIX" indicates a pixel electrode of a liquid crystal cell, "GLS2" indicates the lower substrate, and "POL" indicates the lower polarizer.

The touch screen TSP comprises Tx lines T1 to Tj (j is a positive integer less than n), Rx lines R1 to Ri (i is a positive integer less than m) crossing the Tx lines T1 to Tj, and (i×j) sensor nodes formed at the intersections of the Tx lines T1 to Tj and the Rx lines R1 to Ri.

The touch screen drive circuit comprises a Tx drive circuit 302 and an Rx drive circuit 304. The touch screen drive circuit supplies touch drive pulses to the Tx lines T1 to Tj, and senses the voltage of a sensor node through the Rx lines R1 to Ri and converts them into digital data. The Tx drive circuit 302 and the Rx drive circuit 304 may be integrated in one ROIC (Read-out IC).

The Tx drive circuit 302 selects a Tx channel to output a touch drive pulse in response to a setup signal input from the touch controller 306. Then, the Tx drive circuit 302 supplies a touch drive pulse to the Tx lines T1 to Tj connected to the Tx channel selected in response to the setup signal every sensing time.

The Rx drive circuit 304 selects an Rx channel to receive a sensor node voltage in response to a setup signal input from the touch controller 306. The Rx drive circuit 304 receives and samples the sensor node voltage through the Rx lines R1 to Ri connected to the Rx channel selected in response to the setup signal. The Rx drive circuit 304 incorporates an analog-to-digital converter to convert the sampled sensor node voltage into sensor data, which is digital data, during an analog-to-digital conversion time and transmit it to the touch controller 306.

The touch controller 306 is connected to the Tx drive circuit 302 and the Rx drive circuit 304 over an interface, such as an I2C bus, an SPI (serial peripheral interface, and a system bus. The touch controller 306 supplies a setup signal to the Tx drive circuit 302 and the Rx drive circuit 304 to select a Tx channel to output a touch drive pulse and an Rx channel to read a sensor node voltage. The touch controller 306 supplies the Rx drive circuit 304 with a switch control signal for controlling the sampling timing of a sampling circuit incorporated in the Rx drive circuit 304 to control the sampling timing of the sensor node voltage. The touch controller 306 supplies an ADC clock to the analog-to-digital converter incorporated in the Rx drive circuit 304 to control the digital conversion timing of the sensor node voltage.

Since the physical resolution of the touch screen TSP is lower than the physical resolution of the display panel, the touch controller 306 performs the operation of correcting a difference in physical resolution between the touch screen and the display panel in order to derive accurate coordinate values of a touch position. In order to minimize the distortion of an execution result induced by the process of converting the resolution of touch coordinates, the touch controller 306 compensates the coordinate values of a touch position by applying different offset values for upper, lower, left, and right sides in accordance with the sensor data values of surrounding sensor nodes adjacent to a center node having peak data. In order to further minimize the distortion of an execution result induced by the process of converting the resolution of touch coordinates, the touch controller 306 may compensate the coordinate values of a touch position by correcting the nonlinearity of a change in capacitance (i.e., change in sensor data) depending on a touch position between the sensor nodes of the touch screen TSP, and then applying different offset values for upper, lower, left, and right sides in accordance with the corrected sensor data values of surrounding sensor nodes.

The touch controller 306 transmits the touch coordinate values as digital touch data of an HID format, whose resolution has been converted, to an external host system. The host system executes an application program associated with the coordinate values of touch data input from the touch controller 306.

Figure 18:
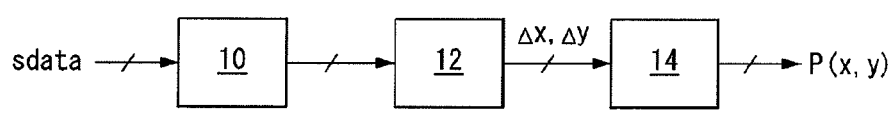
FIG. 18 shows an example of a detailed configuration of a touch controller for correcting a difference in physical resolution between the touch screen and the display panel.

FIG. 18 shows an example of a detailed configuration of the touch controller 306 for correcting a difference in physical resolution between the touch screen and the display panel.

Referring to FIG. 18, the touch controller 306 comprises a peak data detector 10, an offset calculator 12, and a resolution converter 14.

The peak data detector 10 detects peak data, which is the largest data among sensor data Sdata input from the Rx drive circuit 304.

The offset value calculator 12 calculates a first offset value $\Delta x$ for the X-axis based on sensor data of a left sensor node and a right sensor node and peak data, the right sensor node and the left sensor node being disposed at both sides in the X-axis direction, with a center node being interposed therebetween, the center node being closest to a touch position and having the peak data. Also, the offset value calculator 12 calculates a second offset value $\Delta y$ for the Y-axis based on sensor data of an upper sensor node and a lower sensor node and the peak data, the upper sensor node and the lower sensor node being disposed at both sides in the Y-axis direction, with the center node being interposed therebetween.

The resolution converter 14 converts the X coordinate of the touch position into a corrected X coordinate matching the resolution of the display panel DIS by adding the first offset value $\Delta x$ to the X coordinate of the center node and multiplying the resulting value by a first resolution ratio, obtained by dividing the horizontal resolution of the display panel DIS (resolution for the X-axis) by the horizontal resolution of the touch screen TSP. Also, the resolution converter 14 converts the Y coordinate of the touch position into a corrected Y coordinate matching the resolution of the display panel DIS by adding the second offset value $\Delta y$ to the Y coordinate of the center node and multiplying the resulting value by a second resolution ratio, obtained by dividing the longitudinal resolution of the display panel DIS (resolution for the Y-axis) by the longitudinal resolution of the touch screen TSP. The resolution converter 14 outputs the corrected X and Y coordinates as touch coordinate values P(x,y) whose resolution is converted.

Figure 19:
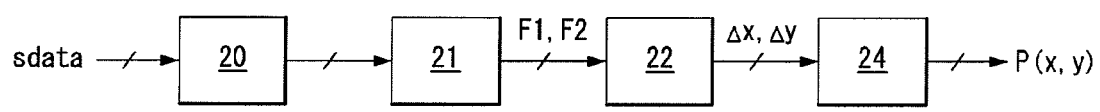
FIG. 19 shows another example of a detailed configuration of the touch controller for correcting a difference in physical resolution between the touch screen and the display panel.

FIG. 19 shows another example of a detailed configuration of the touch controller 306 for correcting a difference in physical resolution between the touch screen and the display panel.

Referring to FIG. 19, the touch controller 306 comprises a peak data detector 20, a nonlinearity corrector 21, an offset calculator 22, and a resolution converter 24.

The peak data detector 20 detects peak data, which is the largest data among sensor data Sdata input from the Rx drive circuit 304.

The nonlinearity corrector 21 generates a first correction function F1 for correcting the nonlinearity of a change in sensor data (i.e., change in capacitance) by position between a center node and a left sensor node or right sensor node, by using sensor data of the left sensor node or right sensor node adjacent to the center node in the X-axis direction and peak data, the center node being closest to the touch position and having the peak data. Then, the nonlinearity corrector 21 firstly corrects the peak data of the center node, the sensor data of the left sensor node, and the sensor data of the right sensor node by using the generated first correction function F1.

The nonlinearity corrector 21 generates a second correction function F2 for correcting the nonlinearity of a change in sensor data (i.e. change in capacitance) by position between the center node and an upper sensor node or lower sensor node, by using sensor data of the upper sensor node or lower sensor node adjacent to the center node in the Y-axis direction and peak data, the center node being closest to the touch position and having the peak data. Also, the nonlinearity corrector 21 secondly corrects the peak data of the center node, the sensor data of the upper sensor node, and the sensor data of the lower sensor node by using the generated second correction function F2.

The offset value calculator 22 calculates a first offset value for the X-axis based on the firstly corrected peak data of the center node and the firstly corrected sensor data of the left and right sensor nodes. Also, the offset value calculator 22 calculates a second offset value for the Y-axis based on the secondly corrected peak data of the center node and the secondly corrected sensor data of the upper and lower sensor nodes.

The resolution converter 24 converts the X coordinate of the touch position into a corrected X coordinate matching the resolution of the display panel DIS by adding the first offset value to the X coordinate of the center node and multiplying the resulting value by a first resolution ratio, obtained by dividing the horizontal resolution of the display panel DIS by the horizontal resolution of the touch screen TSP. Also, the resolution converter 14 converts the Y coordinate of the touch position into a corrected Y coordinate matching the resolution of the display panel DIS by adding the second offset value $\Delta y$ to the Y coordinate of the center node and multiplying the resulting value by a second resolution ratio, obtained by dividing the longitudinal resolution of the display panel DIS (resolution for the Y-axis) by the longitudinal resolution of the touch screen TSP. The resolution converter 14 outputs the corrected X and Y coordinates as touch coordinate values P(x,y) whose resolution is converted.

As described above, the display having a touch sensor and the method for improving the touch performance thereof according to the present invention can minimize the distortion of an execution result induced by the process of converting the resolution of touch coordinates, by compensating the coordinate values of a touch position by applying different offset values for upper, lower, left, and right sides in accordance with the sensor data values of surrounding sensor nodes adjacent to a center node having peak data.

Moreover, the display having a touch sensor and the method for improving the touch performance thereof according to the present invention can further minimize the distortion of an execution result induced by the process of converting the resolution of touch coordinates, by correcting the nonlinearity of a change in capacitance (i.e., change in sensor data) depending on a touch position between the sensor nodes of the touch screen, and then providing different offset values for upper, lower, left, and right sides in accordance with the corrected sensor data values of surrounding sensor nodes. Subsequently, touch performance can be drastically improved.

In view of the above, it will be apparent to those skilled in the art that various changes and modifications may be made thereto without departing from the technical spirit of the invention. Accordingly, the technical scope of the invention is not limited to the above detailed description, but should be determined based on the accompanying claims.

What is claimed is:

1. A method for improving the touch performance of a display having a touch sensor, comprising:

converting a voltage of sensor nodes input from a touch screen integrated with a display panel into sensor data;

detecting peak data from among the sensor data;

calculating a first offset value for the X-axis based on sensor data of a left sensor node and a right sensor node and the peak data, the left sensor node and the right sensor node being disposed at both sides in the X-axis direction, with a center node being interposed therebetween, the center node being closest to a touch position and having the peak data;

compensating the X coordinate of the touch position by adding the first offset value to the X coordinate of the center node to generate a first resulting value and multiplying the first resulting value by a first resolution ratio, obtained by dividing the horizontal resolution of the display panel by the horizontal resolution of the touch screen;

calculating a second offset value for the Y-axis based on sensor data of an upper sensor node and a lower sensor node and the peak data, the upper sensor node and the lower sensor node being disposed at both sides in the Y-axis direction, with the center node being interposed therebetween; and compensating the Y coordinate of the touch position by adding the second offset value to the Y coordinate of the center node to generate a second resulting value and multiplying the second resulting value by a second resolution ratio, obtained by dividing the longitudinal resolution of the display panel by the longitudinal resolution of the touch screen.

2. The method of claim 1, further comprising:

generating a first correction function for correcting the nonlinearity of a change in sensor data by position between the center node and the left sensor node or right sensor node by using the sensor data of either the left sensor node or the right sensor node and the peak data; and firstly correcting the sensor data of the left sensor node, the sensor data of the right sensor node, and the peak data, which are used to calculate the first offset value, by using the first correction function.

3. The method of claim 1, further comprising:

generating a second correction function for correcting the nonlinearity of a change in sensor data by position between the center node and the upper sensor node or lower sensor node by using the sensor data of either the upper sensor node or the right sensor node and the peak data; and secondly correcting the sensor data of the upper sensor node, the sensor data of the lower sensor node, and the peak data, which are used to calculate the second offset value, by using the second correction function.

4. A display having a touch sensor, comprising:

an analog-to-digital converter that converts a voltage of sensor nodes input from a touch screen integrated with a display panel into sensor data;

a peak data detector that detects peak data from among the sensor data;

an offset value calculator that calculates a first offset value for the X-axis based on sensor data of a left sensor node and a right sensor node and the peak data, the left sensor node and the right sensor node being disposed at both sides in the X-axis direction, with a center node being interposed therebetween, the center node being closest to a touch position and having the peak data, and calculates a second offset value for the Y-axis based on sensor data of an upper sensor node and a lower sensor node and the peak data, the upper sensor node and the lower sensor node being disposed at both sides in the Y-axis direction with the center node being interposed therebetween;

a resolution converter that compensates the X coordinate of the touch position by adding the first offset value to the X coordinate of the center node to generate a first resulting value and multiplying the first resulting value by a first resolution ratio, obtained by dividing the horizontal resolution of the display panel by the horizontal resolution of the touch screen and compensates the Y coordinate of the touch position by adding the second offset value to the Y coordinate of the center node to generate a second resulting value and multiplying the second resulting value by a second resolution ratio, obtained by dividing the longitudinal resolution of the display panel by the longitudinal resolution of the touch screen.

5. The display of claim 4, further comprising a first nonlinearity corrector that generates a first correction function for correcting the nonlinearity of a change in sensor data by position between the center node and the left sensor node or right sensor node by using the sensor data of either the left sensor node or the right sensor node and the peak data, and firstly corrects the sensor data of the left sensor node, the sensor data of the right sensor node, and the peak data, which are used to calculate the first offset value, by using the first correction function.

6. The display of claim 4, further comprising: a second nonlinearity corrector that generates a second correction function for correcting the nonlinearity of a change in sensor data by position between the center node and the upper sensor node or lower sensor node by using the sensor data of either the upper sensor node or the right sensor node and the peak data, and secondly corrects the sensor data of the upper sensor node, the sensor data of the lower sensor node, and the peak data, which are used to calculate the second offset value, by using the second correction function.

* * * * *